(12) United States Patent
Chun et al.

(10) Patent No.: US 8,761,293 B2
(45) Date of Patent: Jun. 24, 2014

(54) METHOD AND APPARATUS FOR TRANSMITTING A FEEDBACK CHANNEL IN A WIRELESS COMMUNICATION SYSTEM

(75) Inventors: Jin Young Chun, Anyang-si (KR); Su Nam Kim, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 13/322,107

(22) PCT Filed: May 28, 2010

(86) PCT No.: PCT/KR2010/003412
§ 371 (c)(1),
(2), (4) Date: Nov. 22, 2011

(87) PCT Pub. No.: WO2010/137915
PCT Pub. Date: Dec. 2, 2010

(65) Prior Publication Data
US 2012/0063408 A1    Mar. 15, 2012

Related U.S. Application Data

(60) Provisional application No. 61/181,673, filed on May 28, 2009, provisional application No. 61/218,399, filed on Jun. 18, 2009.

(30) Foreign Application Priority Data

May 28, 2010 (KR) ........................ 10-2010-0050177

(51) Int. Cl.
*H04B 7/02* (2006.01)

(52) U.S. Cl.
USPC ........... 375/267; 375/260; 375/262; 375/265; 375/340; 375/343

(58) Field of Classification Search
USPC .......... 375/267, 260, 262, 265, 340; 370/203, 370/204, 205, 208, 209, 210
See application file for complete search history.

(56) References Cited

U.S. PATENT DOCUMENTS

| | | | |
|---|---|---|---|
| 7,961,796 B2 * | 6/2011 | You et al. | 375/260 |
| 8,160,601 B2 * | 4/2012 | Veselinovic et al. | 455/452.2 |
| 8,238,958 B2 * | 8/2012 | Bourlas et al. | 455/522 |
| 2008/0170634 A1 * | 7/2008 | Kwak et al. | 375/260 |
| 2009/0097583 A1 * | 4/2009 | Shin et al. | 375/267 |
| 2009/0245337 A1 * | 10/2009 | Ramachandran et al. | 375/224 |

FOREIGN PATENT DOCUMENTS

KR    10-2007-0074708 A    7/2007

* cited by examiner

*Primary Examiner* — Dhaval Patel
(74) *Attorney, Agent, or Firm* — Mckenna Long & Aldridge LLP

(57) ABSTRACT

Provided are a method and an apparatus for transmitting a feedback channel in a wireless communication system. User equipment measures a modulation-and coding scheme (MCS) level obtained by quantizing a carrier-to-interference-plus-noise ratio (CINR), maps feedback information including the MCS level to a feedback channel, and transmits the feedback channel.

11 Claims, 10 Drawing Sheets

METHOD AND APPARATUS FOR TRANSMITTING A FEEDBACK CHANNEL IN A WIRELESS COMMUNICATION SYSTEM

CROSS-REFERENCE TO RELATED APPLICATIONS

This application is a 35 U.S.C. §371 National Stage entry of International Application No. PCT/KR2010/003412, filed on May 28, 2010, and claims the benefit of priority of U.S. Provisional application No. 61/181,673 filed on May 28, 2009, U.S. Provisional application No. 61/218,399 filed on Jun. 18, 2009, and Korean Patent application No. 10-2010-0050177 filed on May 28, 2010, all of which are incorporated by reference in their entirety herein.

BACKGROUND OF THE INVENTION

1. Field of the Invention

The present invention relates to wireless communication and, more specifically, to a method and apparatus for transmitting a feedback channel in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A control channel may be used to transmit various types of control signals for communication between a base station and a mobile station. Furthermore, a channel quality feedback, a multiple-input multiple-output (MIMO) feedback, a hybrid automatic repeat request (HARQ) feedback, etc. may be transmitted through an uplink control channel.

There is a need for a method of efficiently utilizing uplink resources when various types of feedback information are transmitted.

SUMMARY OF THE INVENTION

The present invention provides a method and apparatus for transmitting a feedback channel in a wireless communication system.

In an aspect, a method of transmitting a feedback channel in a wireless communication system is provided. The method includes measuring a modulation and coding scheme (MCS) level obtained by quantizing a carrier to interference plus noise ratio (CINR) of a mobile station, mapping feedback information, including the MCS level, to the feedback channel, and transmitting the feedback channel. The MCS level may be represented by 2 bits. The CINR may be a differential CINR which is a difference value between the CINR and a reference CINR. The MCS level may be a measurable MCS level in a group, if the mobile station is allocated to the group including a plurality of mobile stations. The mapping the feedback information to the feedback channel may comprises generating a feedback sequence based on the feedback information, mapping the feedback sequence to a feedback symbol by modulating and repeating the generated feedback sequence, and mapping the feedback symbol to a subcarrier allocated to the feedback channel. Uplink resources allocated to the feedback channel may comprise 3 distributed tiles, and the tile may comprise 2 contiguous subcarrier and 6 orthogonal frequency division multiplexing (OFDM) symbols. The feedback information may be multiplexed with feedback information of at least one another user and mapped to the feedback channel. The mapping the feedback information to the feedback channel may comprise mapping a feedback orthogonal sequence corresponding to the measured MCS level, from among a plurality of different orthogonal sequences, to 3 distributed hybrid automatic repeat request (HARQ) mini-tiles (HMTs) which are uplink resources allocated to the feedback channel, wherein the HMT comprises 2 contiguous subcarrier and 2 OFDM symbols. A number of the plurality of different orthogonal sequences may be extended. Some pieces of multiple-input multiple-output (MIMO) information or bandwidth request information may be indicated by using some of the plurality of different orthogonal sequences.

In another aspect, an apparatus for transmitting a feedback channel in a wireless communication system is provided. The apparatus includes a radio frequency (RF) unit configured to transmit the feedback channel, and a processor, coupled to the RF unit, and configured for measuring a modulation and coding scheme (MCS) level obtained by quantizing a carrier to interference plus noise ratio (CINR) of a mobile station, and mapping feedback information, including the MCS level, to the feedback channel. The MCS level may be represented by 2 bits. The CINR may be a differential CINR which is a difference value between the CINR and a reference CINR. The MCS level may be a measurable MCS level in a group, if the mobile station is allocated to the group including a plurality of mobile stations.

Since a mobile station transmits a modulation and coding scheme (MCS) level using a less amount of resources, signaling overhead of feedback information when a plurality of users exists can be reduced.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
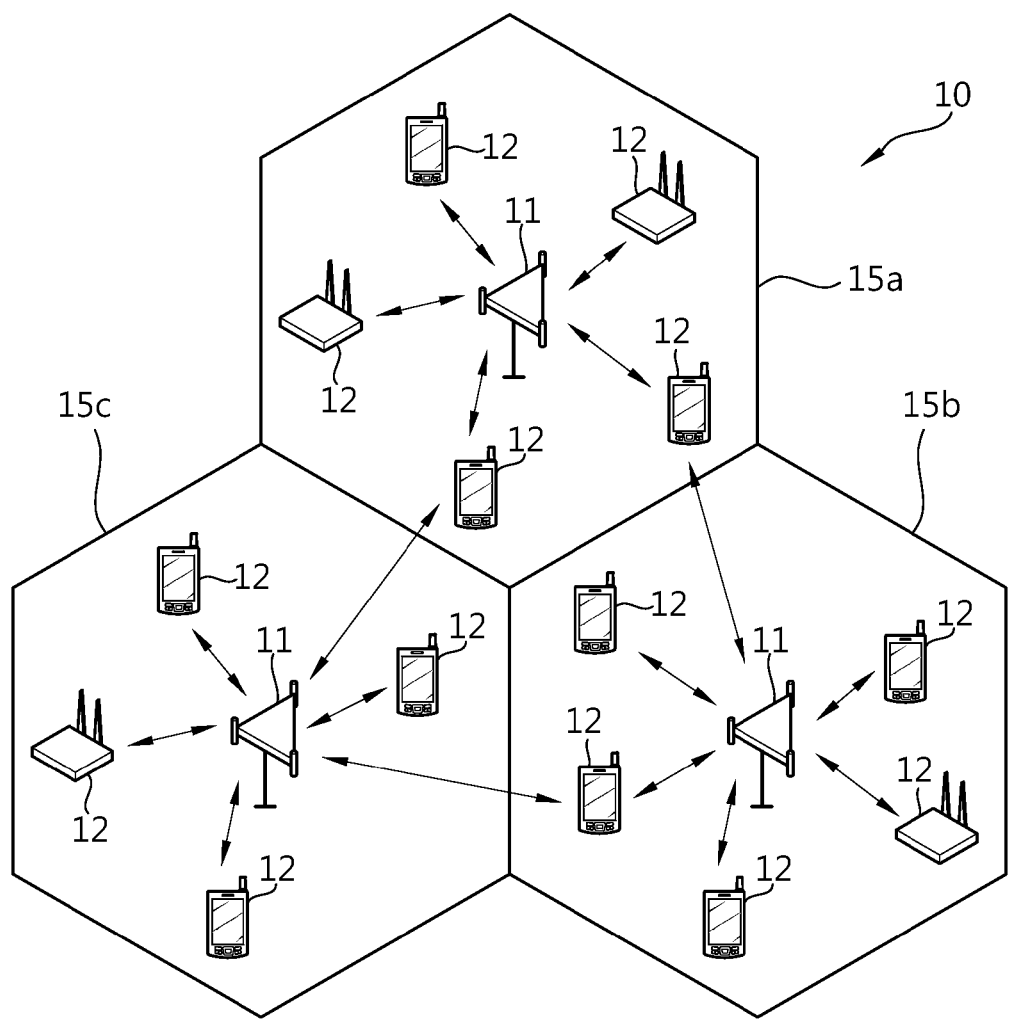
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
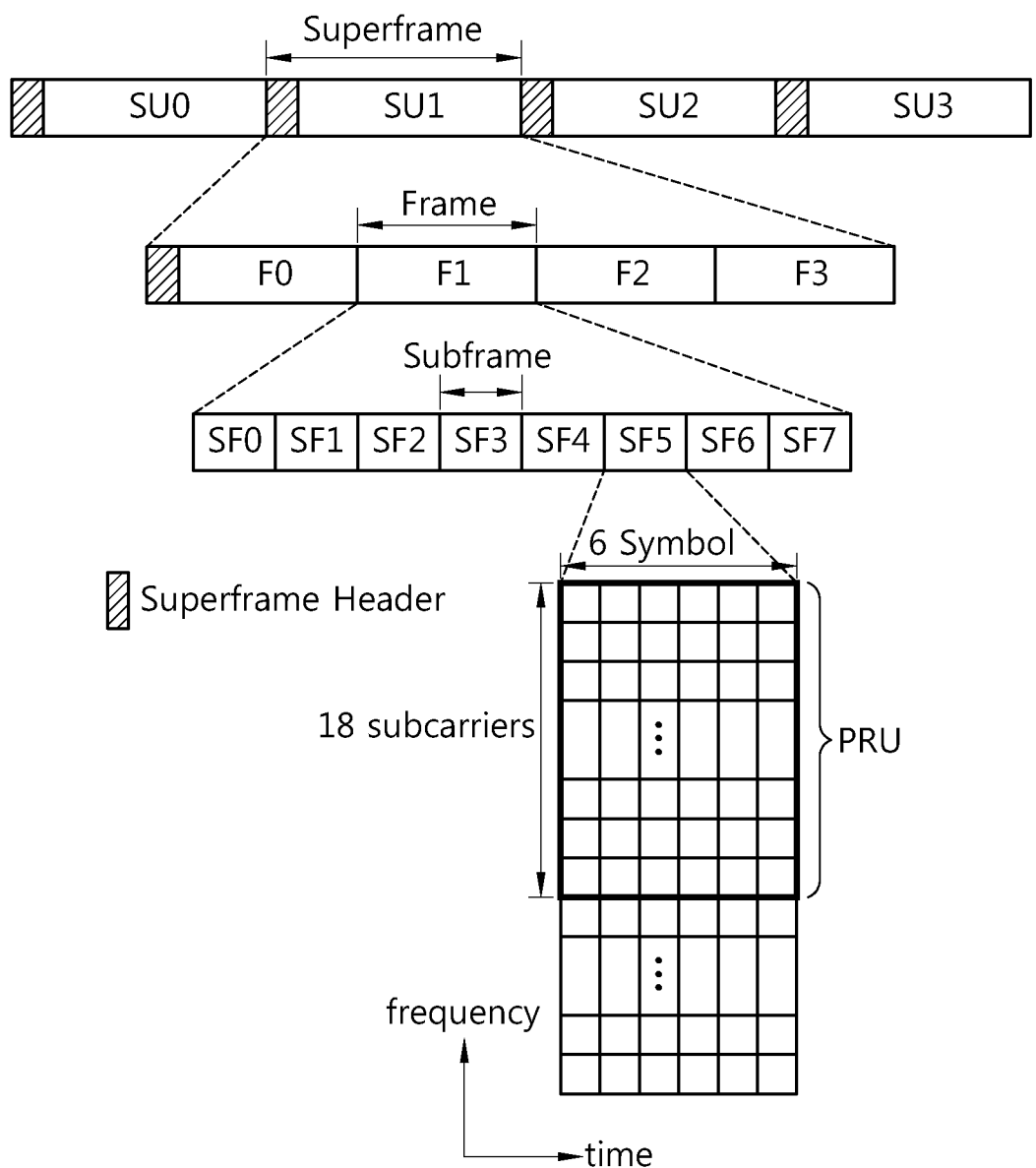
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a subcarrier group distributed in a resource region in one frequency partition. The DRU has the same size as the PRU. A minimum unit for consisting the DLRU may be a tile.

A contiguous logical resource unit (CLRU) may be used to obtain a frequency selective scheduling gain. The CLRU includes a subcarrier group contiguous in a resource region. The CLRU has the same size as the PRU.

Figure 3:
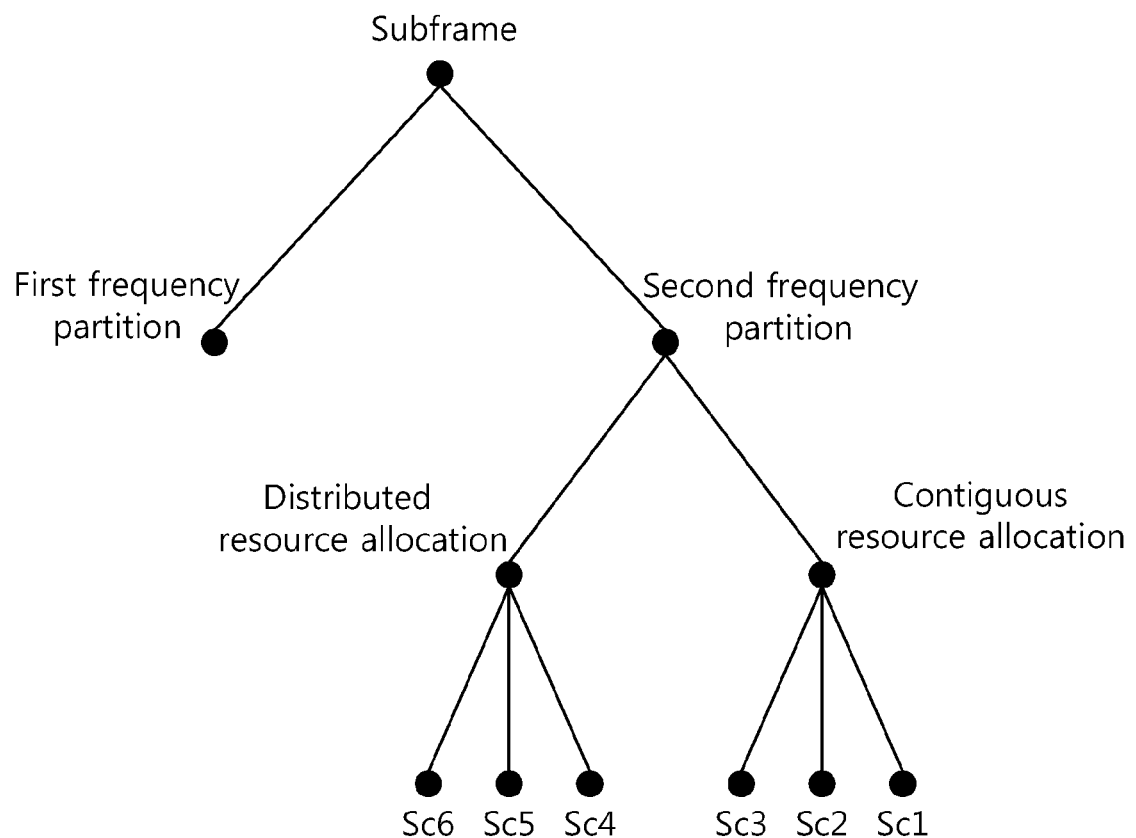
FIG. 3 shows an example of an uplink resource structure.

FIG. 3 shows an example of an uplink resource structure.

Referring to FIG. 3, an uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

Hereafter, a control channel used for transmitting a control signal or a feedback signal is described. The control channel may be used for transmission of various kinds of control signals for communication between a base station and a user equipment. The control channel described below may be applied to an uplink control channel and a downlink control channel.

The control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

An uplink control channel may include a fast feedback channel (FFBCH), a hybrid automatic repeat request (HARQ) feedback channel (HFBCH), a ranging channel, a bandwidth request channel (BRCH), and so on. The FFBCH, the HFBCH, the ranging channel, the BRCH, etc. may be placed anywhere in an uplink subframe or frame.

An FFBCH carries CQI and/or MIMO information feedbacks, and it may be divided into two types; a primary fast feedback channel (PFBCH) and a secondary fast feedback channel (SFBCH). The PFBCH carries information of 4 to 6 bits and provides wideband CQI and/or MIMO feedbacks. The SFBCH carries information of up to 24 bits and provides narrowband CQI and/or MIMO feedbacks. The SFBCH may support a larger number of control information bits by using a higher code rate. The PFBCH supports non-coherent detection not using a pilot, and the SFBCH supports coherent detection using a pilot. The FFBCH may be allocated to a predetermined location in a broadcast message. The FFBCH may be periodically allocated to an MS. Pieces of feedback information of a plurality of MSs may be multiplexed in accordance with time division multiplexing (TDM), frequency division multiplexing (FDM), and code division multiplexing (CDM) schemes and transmitted through the FFBCH. The FFBCH transmitted by ACK/NACK signals in response to data to which an HARQ scheme is applied may be started from a predetermined offset upon data transmission.

Figure 4:
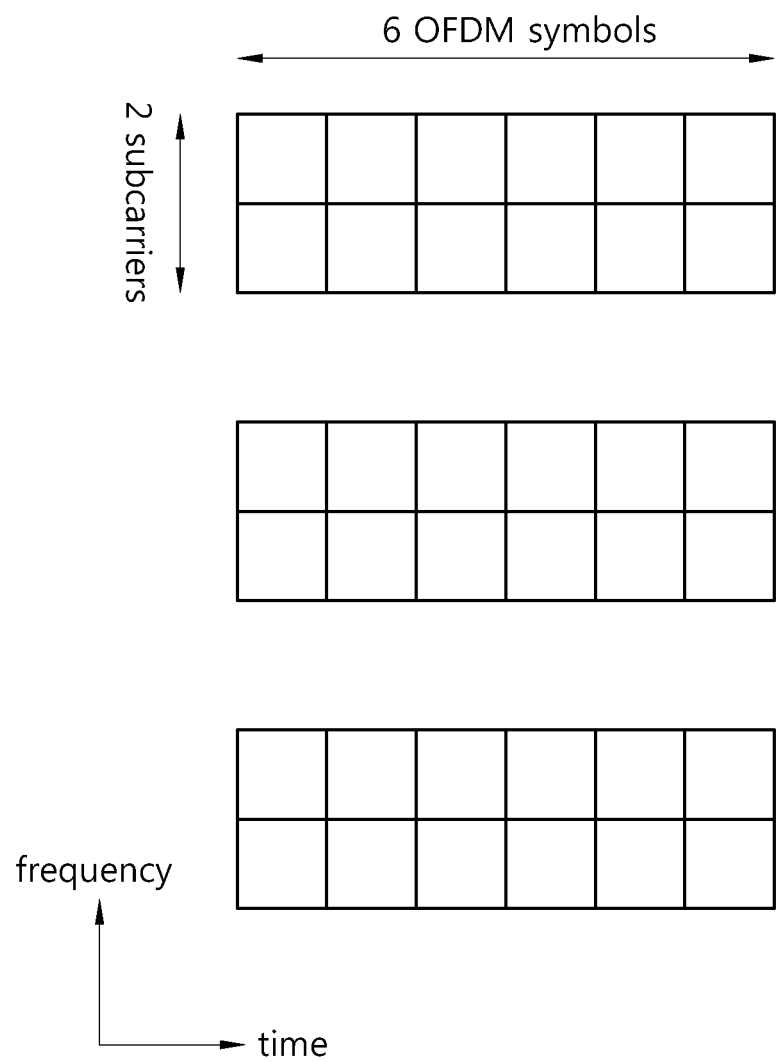
FIG. 4 shows an example of uplink resources used in the PFBCH.

FIG. 4 shows an example of uplink resources used in the PFBCH.

The PFBCH may include 3 distributed uplink feedback mini-tiles (FMTS). The FMT may be defined by 2 contiguous subcarriers and 6 OFDM symbols. One resource unit including 18 subcarriers and 6 OFDM symbols may include 3 FFBCHs.

Figure 5:
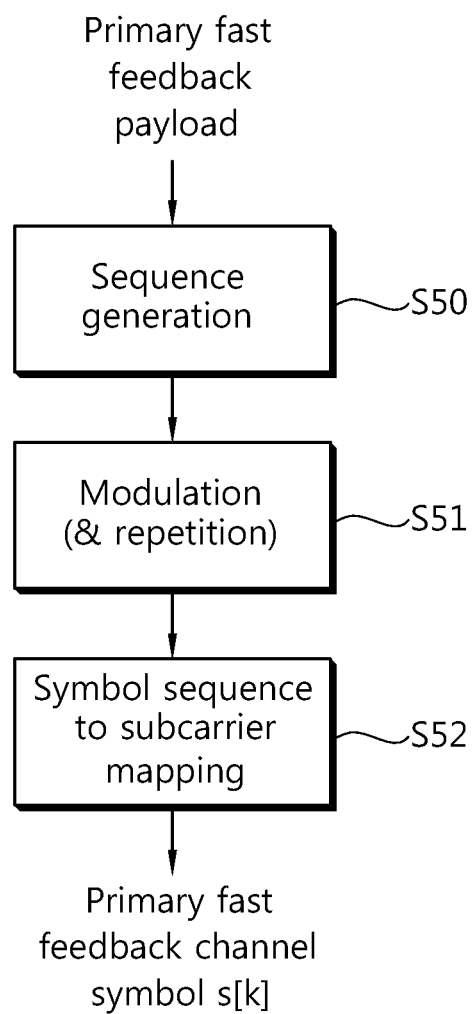
FIG. 5 a block diagram showing a process in which information is mapped to the PFBCH.

FIG. 5 a block diagram showing a process in which information is mapped to the PFBCH. At step S50, a PFBCH sequence is generated using a PFBCH payload. The PFBCH sequence may be selected from a predetermined PFBCH sequence set. Table 1 is an example of a PFBCH sequence set.

| Index | Sequence |
|---|---|
| 0 | 111111111111 |
| 1 | 101111010110 |
| 2 | 011010111101 |
| 3 | 001010010100 |
| 4 | 101010101010 |
| 5 | 111010000011 |
| 6 | 001111101000 |
| 7 | 011111000001 |
| 8 | 110011001100 |
| 9 | 100011100101 |
| 10 | 010110001110 |
| 11 | 000110100111 |
| 12 | 100110011001 |
| 13 | 110110110000 |
| 14 | 000011011011 |
| 15 | 010011110010 |
| 16 | 101011111100 |
| 17 | 111011010101 |
| 18 | 001110111110 |
| 19 | 011110010111 |
| 20 | 111110101001 |
| 21 | 101110000000 |
| 22 | 011011101011 |
| 23 | 001011000010 |
| 24 | 100111001111 |
| 25 | 110111100110 |
| 26 | 000010001101 |
| 27 | 010010100100 |
| 28 | 110010011010 |
| 29 | 100010101011 |
| 30 | 010111011000 |
| 31 | 000111110001 |
| 32 | 101011001001 |
| 33 | 111011100000 |
| 34 | 001110001011 |
| 35 | 011110100010 |
| 36 | 100111111010 |
| 37 | 110111010011 |
| 38 | 000010111000 |
| 39 | 010010010001 |
| 40 | 111110011100 |
| 41 | 101110110101 |
| 42 | 011011011110 |
| 43 | 001011110111 |
| 44 | 101010011111 |
| 45 | 111010110110 |
| 46 | 001111011101 |
| 47 | 011111110100 |
| 48 | 111111001010 |
| 49 | 101111100011 |
| 50 | 011010001000 |
| 51 | 001010100001 |
| 52 | 110010101111 |
| 53 | 100010000110 |
| 54 | 010111101101 |
| 55 | 000111000100 |
| 56 | 100110101100 |
| 57 | 110110000101 |
| 58 | 000011101110 |
| 59 | 010011000111 |
| 60 | 110011111001 |
| 61 | 100011010000 |
| 62 | 010110111011 |
| 63 | 000110010010 |

At step S51, the generated PFBCH sequence is modulated, repeated, and mapped to an uplink PFBCH symbol s[k]. Here, 0 of the PFBCH sequence may be mapped to 1, and 1 thereof may be mapped to −1. At step S52, the uplink PFBCH symbol s[k] is mapped to the subcarriers of an FMT according to Equation 1.

$$C_{i,j} = s[K_i[j]], \text{ for } i=0,1,2, 0 \le j \le 11$$

Here, $K_i[j]$ indicates a $j^{th}$ element of $K_i$ and indicates $K_0=\{0,1,2,3,4,5,6,7,8,9,10,11\}$, $K_1=\{9,10,11,3,4,5,0,1,2,6,7,8\}$, and $k_2=\{3,4,5,6,7,8,9,10,11,0,1,2\}$. If a sequence set of 12 bits is used as in the PFBCH sequence set of Table 1, the PFBCH sequence may carry information of a maximum of 6 bits.

An HFBCH is a channel for transmitting acknowledgement (ACK)/non-acknowledgement (NACK) signals in response to data transmission. The HFBCH may include 3 distributed FMTs, and the FMT may include 2 contiguous subcarriers and 6 OFDM symbols. The 3 distributed FMTs may support 6 HFBCHs if the HFBCH carries 1-bit HARQ feedback information and support 3 HFBCHs if the HFBCH carries 2-bit HARQ feedback information. Accordingly, one resource unit including 18 subcarriers and 6 OFDM symbols may include 18 or 9 HFBCHs. The HFBCH carrying 1-bit HARQ information sends pieces of ACK/NACK information for one HARQ DL burst. The HFBCH carrying 2-bit HARQ information sends pieces of ACK/NACK information for 2 HARQ DL bursts or pieces of ACK/ACK, ACK/NACK, NACK/ACK, and NACK/NACK information for the HARQ DL bursts of 2 streams.

Figure 6:
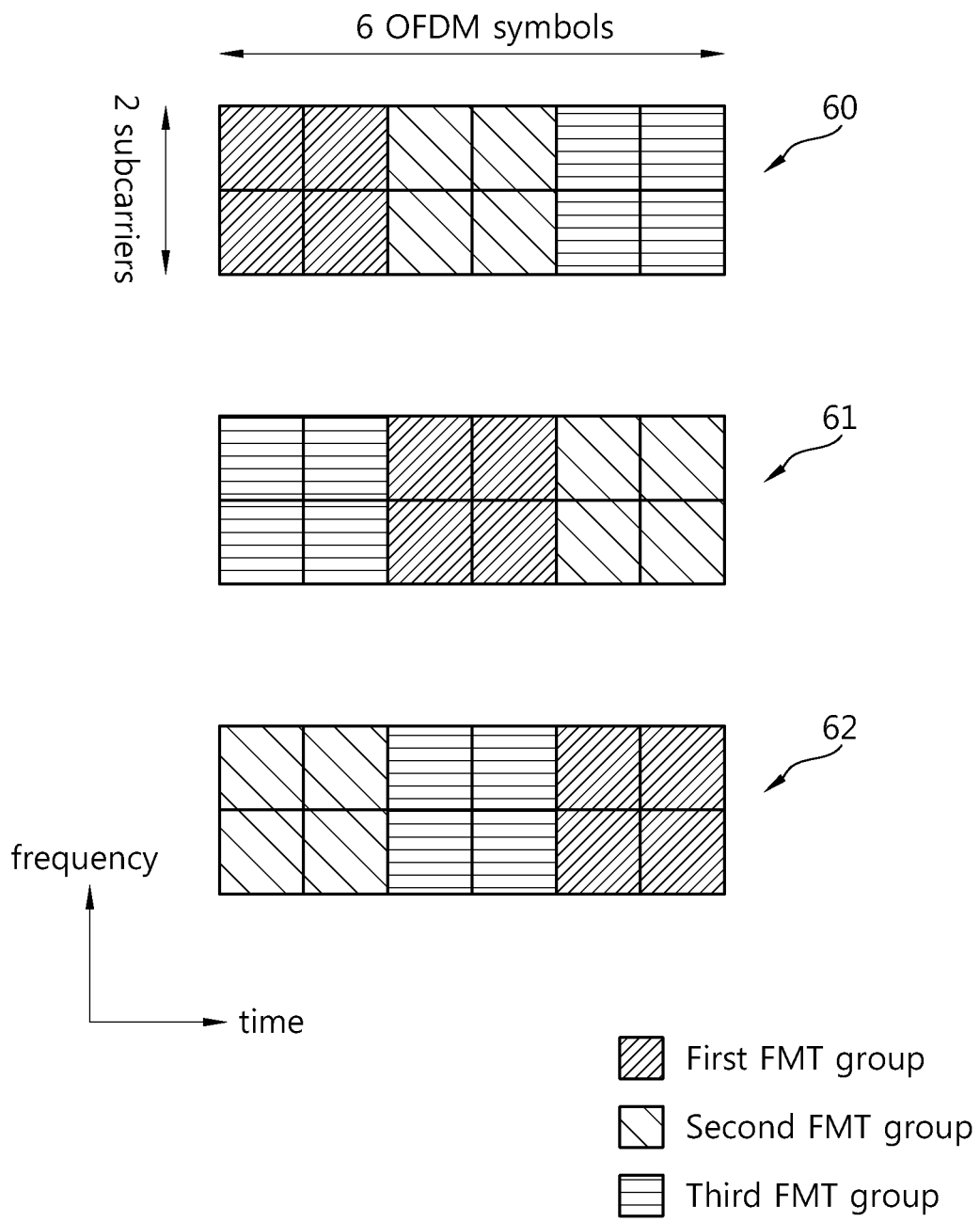
FIG. 6 shows an example of uplink resources used in the HFBCH.

FIG. 6 shows an example of uplink resources used in the HFBCH.

FMTs 60, 61, and 62 may be subdivided into HMT HARQ mini-tiles (HMTs). The HMT may include 2 subcarriers and 2 OFDM symbols. Accordingly, one FMT may include 3 HMTs. A pair of HFBCHs may be allocated to the HMT. A pair of HFBCHs may be allocated to 3 HMTs. That is, a first HFBCH pair HFBCHs #0 and #1 are allocated to a first FMT group, a second HFBCH pair HFBCHs #2 and #3 are allocated to a second FMT group, and a third HFBCH pair HFBCHs #4 and #5 are allocated to a third FMT group. Furthermore, orthogonal sequences $C_{i,0}$, $C_{i,1}$, $C_{i,2}$, and $C_{i,3}$ (where i=0, 1, 2) are mapped to each HMT, thus forming the HFBCH. Here, i indicates an HMT index. 3 distributed FMTs include a total of 9 HMTs (3 FMT groups) and thus support 6 HFBCHs.

Table 2 shows an example of orthogonal sequences used in the HFBCH. When each HFBCH carries HARQ feedback information of 1 bit, 2 sequences may be used to send each ACK/NACK. Accordingly, 2 HFBCHs allocated to one FMT group may use 4 orthogonal sequences.

| Sequence index | Orthogonal sequence $(C_{i,0}, C_{i,1}, C_{i,2}, C_{i,3})$ | 1-bit Feedback |
|---|---|---|
| 0 | [+1 +1 +1 +1] | Even numbered channel ACK |
| 1 | [+1 −1 +1 −1] | Even numbered channel NACK |
| 2 | [+1 +1 −1 −1] | Odd numbered channel ACK |
| 3 | [+1 −1 −1 +1] | Odd numbered channel NACK |

A ranging channel is a channel used for uplink synchronization. The ranging channel may be divided into a ranging channel for a non-synchronized MS and a ranging channel for a synchronized MS. A BRCH is a channel to request radio resources for transmitting uplink data or a control signal that will be requested by an MS.

Persistent allocation (PA) means that data is allocated using one MAP information element (IE). In general, when data is allocated, the MAP IE has to be transmitted. If data is periodically allocated as in voice over internet protocol (VoIP) service, the MAP IE needs not to be transmitted whenever data is allocated. Accordingly, when a PA MAP IE is transmitted once, data can be continuously transmitted in a designated cycle for time designated by the PA MAP IE. PA may be applied to both downlink and uplink.

Group resource allocation (GRA) means that users having the same modulation and coding scheme (MCS) or multiple-input multiple-out (MIMO) scheme are bundled and data is allocated to one MAP IE. Since the same MAP IE is allocated to a plurality of users, signaling overhead can be reduced. ABS may inform information about that an MS belongs to what group and that the group uses what MCS level of the relevant MS by sending a group configuration A-MAP IE or a group configuration media access control (MAC) message. After the MS is allocated to a specific group, the BS allocates resources and data to the relevant MS. The BS may allocate resources and data by sending a GRA A-MAP IE. The GRA A-MAP IE is included in user-specific resource allocation in an A-MAP region. The GRA A-MAP IE may include bit-maps, indicating a scheduled MS, an MCS level, an MIMO mode, or the size of allocated resources.

The MCS level may be used in the transmission of a channel quality indicator (CQI) or a carrier to interference plus noise ratio (CINR). The CQI or the CINR may be quantized by the MCS level. The MS sends the CQI or the CINR to the BS by selecting a predetermined MCS level. The CQI or the CINR may be transmitted through the FFBCH, such as the PFBCH or the SFPBCH. The relevant MCS level may indicate a modulation scheme, such as QPSK or 16QAM, and a code rate.

Table 3 is an example of the MCS level.

| MCS index | Modulation | Code rate |
|---|---|---|
| '0000' | QPSK | 31/256 |
| '0001' | QPSK | 48/256 |
| '0010' | QPSK | 71/256 |
| '0011' | QPSK | 101/256 |
| '0100' | QPSK | 135/256 |
| '0101' | QPSK | 171/256 |
| '0110' | 16QAM | 102/256 |
| '0111' | 16QAM | 128/256 |
| '1000' | 16QAM | 155/256 |
| '1001' | 16QAM | 184/256 |
| '1010' | 64QAM | 135/256 |
| '1011' | 64QAM | 157/256 |
| '1100' | 64QAM | 181/256 |
| '1101' | 64QAM | 205/256 |
| '1110' | 64QAM | 225/256 |
| '1111' | 64QAM | 237/256 |

Figure 7:
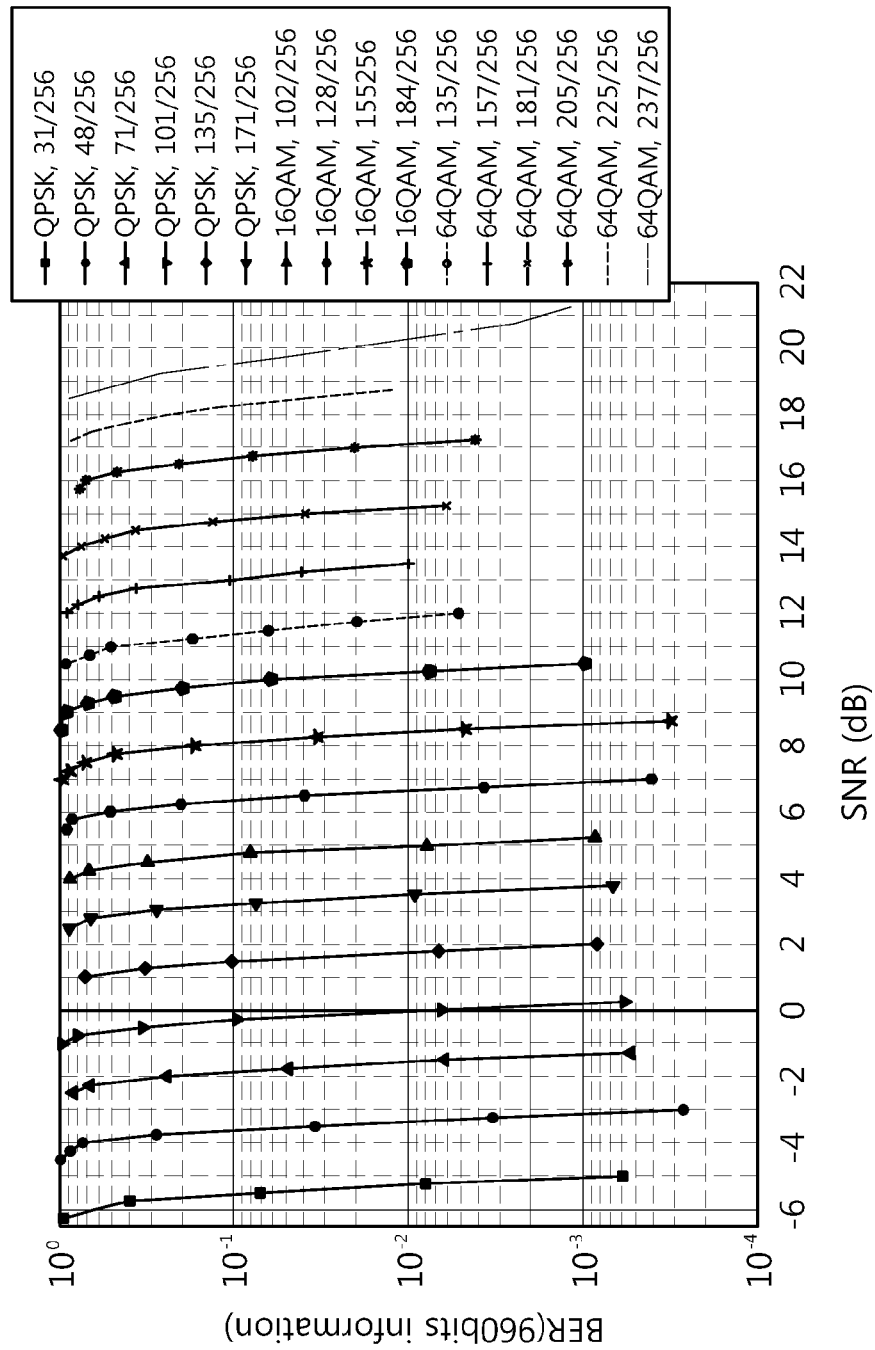
FIG. 7 shows a performance graph in additive white Gaussian noise (AWGN) according to the MCS level of Table 4.

FIG. 7 shows a performance graph in additive white Gaussian noise (AWGN) according to the MCS level of Table 4.

FIG. 7 shows a change of a bit error rate (BER) according to a signal-to-noise ratio (SNR). It can be seen that the signal-to-noise ratios (SNRs) of the MCS levels have a difference in the performance of about 2 dB in a specific BER.

If data is allocated to a lot of users (e.g., VoIP service) within limited resources as in the PA or GRA, each user requires a large amount of uplink resources in order to send all pieces of feedback information to a BS. For example, in case of VoIP, it is assumed that 300 users are supported per bandwidth of 10 MHz in one superframe (20 ms). In this case, if one frame (5 ms) supports 75 users and a feedback is transmitted every 5 ms and 75 feedback channels are transmitted every 10 ms in one frame, 38 feedback channels are necessary for one frame. In general, if a TDD system in which one frame includes 8 subframes and a ratio of downlink subframes and uplink subframes is 5:3 is used, 75 or 38 feedback channels must be transmitted in 3 uplink subframes within one frame. Since one resource unit may include 3 feedback channels, 25 or 13 resource units are necessary. Furthermore, since one MS may send one or more feedback channels, a necessary amount of uplink resources may be further increased.

Accordingly, a method of more efficiently using resources when a feedback channel is transmitted needs to be proposed. A proposed method of transmitting a feedback channel is described below in connection with an embodiment. In the present invention, an example where a plurality of users to which data has been applied according to PA or GRA sends feedback channels is assumed, but not limited thereto. A plurality of users may exist according to various data allocation methods.

Figure 8:
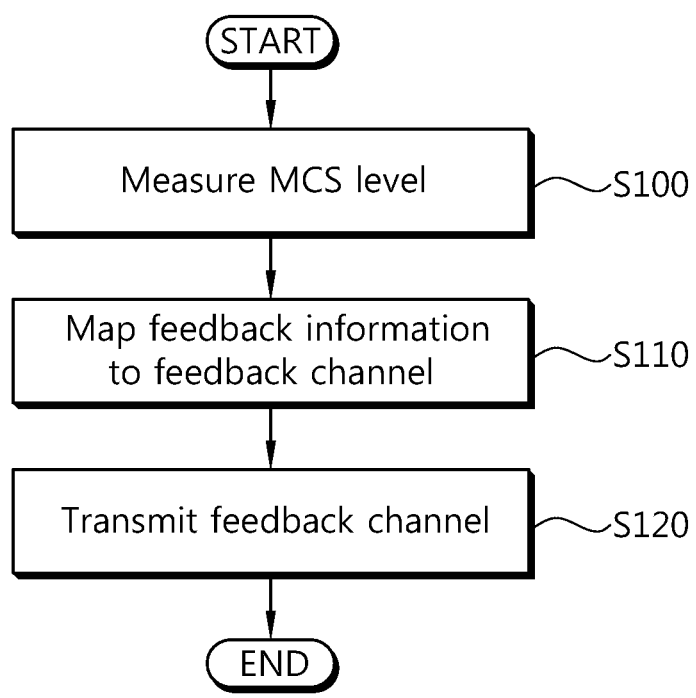
FIG. 8 is an embodiment of a proposed method of transmitting a feedback channel.

FIG. 8 is an embodiment of the proposed method of transmitting a feedback channel.

At step S100, an MS measures a modulation and coding scheme (MCS) level obtained by quantizing a carrier to interference plus noise ratio (CINR). At step S110, the MS maps feedback information, including the MCS level, to a feedback channel. At step S120, the MS sends the feedback channel to a BS.

In sending the feedback information including the MCS level, various methods for using a less amount of resources may be proposed.

First, an MCS level using a differential CINR may be transmitted instead of sending the MCS level itself.

Figure 9:
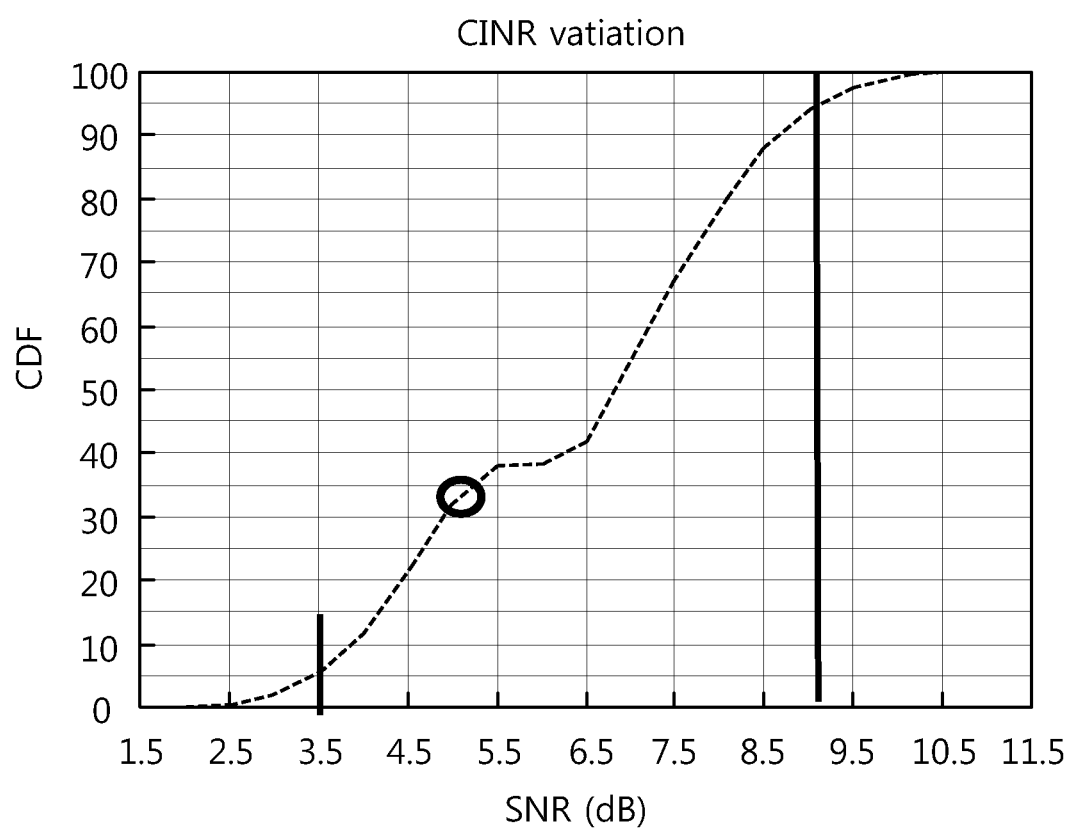
FIG. 9 is a graph showing degree of a variation in the CINR when an MS having the SNR of 5 dB periodically sends data.

FIG. 9 is a graph showing degree of a variation in the CINR when an MS having the SNR of 5 dB periodically sends data.

If data is periodically transmitted using the same resources as in PA, both the CINRs of 16 MCS levels and 32 MCS levels, such as that of Table 3, may not be necessary because a variation of the CINR is not great. Referring to FIG. 9, the CINR of an MS has a probability of about 90% that the CINR may vary within 5.5 dB of 3.5 dB~9 dB and a probability of almost 100% that the CINR may vary within 8 dB of 2.5 dB~10.5 dB. Accordingly, MCS levels for a plurality of users to which data has been allocated according to PA can be sufficiently represented by 4 levels. For example, the CINR of the MS may be represented by a differential CINR of −P, 0, +P, +2P on the basis of a reference CINR (e.g., about 5 dB of FIG. 9), and the differential CINR may be transmitted in the MCS levels of 2 bits. Here, the P is an interval between the MCS levels, and it may have a size of about 1.6 dB. The reference CINR may be transmitted for a long term through the PFBCH, and the differential CINR may be transmitted for a short term shorter than the long term.

Alternatively, only some of predetermined MCS levels may be used.

In case of GRA, MCS levels supported by each group may be limited. For example, an MCS level of an MS belonging to a group 1 may be MCS level indices 0 to 3, and an MCS level of an MS belonging to a group 2 may be MCS level indices 4 to 7. Accordingly, each MS may measure an MCS level within an MCS level supported by a group to which the relevant MS belongs. If a measured MCS level is out of a range of an MCS level supported by a group to which a relevant MS belongs, the MS may also inform relevant information.

Alternatively, the MCS level may be transmitted more efficiently by configuring a new feedback channel, instead of sending the MCS level through the existing FFBCH. A feedback channel for transmitting the MCS level is hereinafter called a mini-feedback channel (MFBCH). The following three kinds of methods may be taken into account as a method of configuring the MFBCH.

1) The MFBCH may be configured by multiplexing the existing PFBCH. The PFBCH may send information of 6 bits by using 64 codewords. The number of levels used when the MCS level is transmitted in the MFBCH is N, and the number of users that may be multiplexed in one PFBCH is 64/N. For example, if the number of MCS levels is 16, 64 codewords may be allocated to 4 users in one PFBCH, and thus the 4 users may send the MCS levels by using the same uplink resources. A BS receives 4 codewords, multiplexed according to a CDM scheme, from the 4 users. If the number of supported MCS levels is reduced, a larger number of users may be multiplexed.

2) The MCS level may be transmitted by configuring an HFBCH for transmitting 2-bit HARQ feedback information by using an MFBCH. Accordingly, the structure of uplink resources of the HFBCH of FIG. 6 may be used without change. Here, a maximum of four MCS level may be supported. The 4 MCS levels may be selected from the existing 16 MCS levels of Table 3, or a differential CINR measured on the basis of a reference CINR may be used as the MCS level.

Table 4 is an example of an MFBCH configured by using a differential CINR as an MCS level.

| Sequence index | Orthogonal sequence $(C_{i,0}, C_{i,1}, C_{i,2}, C_{i,3})$ | MFBCH (differential CINR) |
| --- | --- | --- |
| 0 | [+1 +1 +1 +1] | −1 MCS level |
| 1 | [+1 −1 +1 −1] | 0 (stay) |
| 2 | [+1 +1 −1 −1] | +1 MCS level |
| 3 | [+1 −1 −1 +1] | +2 MCS level |

If 4 or more MCS levels are supported, the MFBCH may be configured by adding orthogonal sequences in Table 4. For example, if 4 orthogonal sequences are added to become a total of 8 orthogonal sequences, an MCS level may be represented by using 3 bits. The MCS level may be extended according this method.

Table 5 shows an example where 4 orthogonal sequences are added to orthogonal sequences of Table 4. The MCS level may be extended by using a total of 8 orthogonal sequences.

| Sequence index | Sequences |
| --- | --- |
| 0 | [+1 +1 +1 +1] |
| 1 | [+1 −1 +1 −1] |
| 2 | [+1 +1 −1 −1] |
| 3 | [+1 −1 −1 +1] |
| 4 | [+1 −j +1 −j] |
| 5 | [+1 +j +1 +j] |
| 6 | [+1 −j −1 −j] |
| 7 | [+1 +j −1 −j] |

Table 6 is an example of MFBCHs configured by using the 8 orthogonal sequences of Table 5. Some of the orthogonal sequences may carry some MIMO information or bandwidth request information, from among pieces of feedback information transmitted through a PFBCH.

| Sequence index | Sequences | MFBCH (differential CINR) | MFBCH (CINR for GRA) |
| --- | --- | --- | --- |
| 0 | [+1 +1 +1 +1] | −1 MCS level | When data is allocated by GRA, some MIMO information or bandwidth request information |
| 1 | [+1 −1 +1 −1] | 0 (stay) | |
| 2 | [+1 +1 −1 −1] | +1 MCS level | |
| 3 | [+1 −1 −1 +1] | +2 MCS levels | |
| 4 | [+1 −j +1 −j] | Some MIMO information or bandwidth request information | |
| 5 | [+1 +j +1 +j] | | |
| 6 | [+1 −j −1 −j] | | |
| 7 | [+1 +j −1 −j] | | |

Figure 10:
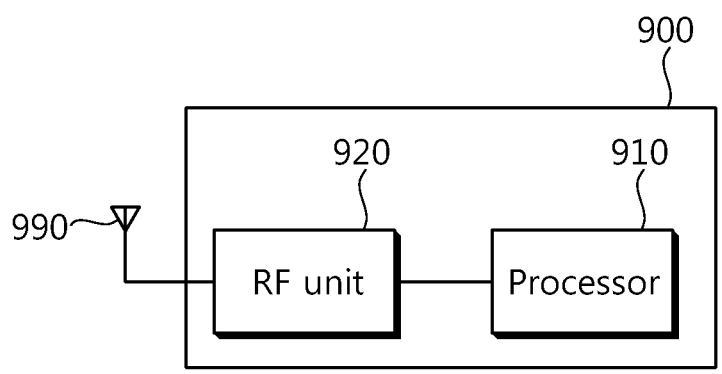
FIG. 10 is a block diagram showing an MS in which the embodiments of the present invention are implemented.

FIG. 10 is a block diagram showing an MS in which the embodiments of the present invention are implemented.

The MS 900 includes a processor 910 and a radio frequency (RF) unit 920. The processor 910 is coupled to the RF unit 920, and it measures an MCS level obtained by quantizing a CINR of the MS and maps feedback information, including the MCS level, to a feedback channel. The RF unit 920 sends the feedback channel to a BS.

The present invention may be implemented by hardware, software, or a combination thereof. The hardware may be implemented as an application specific integrated circuit (ASIC), digital signal processing (DSP), a programmable logic device (PLD), a field programmable gate array (FPGA), a processor, a controller, a microprocessor, other electronic units, or a combination thereof, all of which is designed in order to perform the above-mentioned functions. The software may be implemented as a module performing the above-mentioned functions. The software may be stored in a memory unit and is executed by a processor. The memory unit or the processor may adopt various units that are known to those skilled in the art.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method of transmitting a feedback channel in a wireless communication system, the method comprising:
    measuring a modulation and coding scheme (MCS) level obtained by quantizing a carrier to interference plus noise ratio (CINR) of a mobile station,
    wherein the CINR is a differential CINR which is a difference value between the CINR and a reference CINR;
    mapping feedback information, including the MCS level, to the feedback channel,
    wherein the mapping feedback information to the feedback channel comprises mapping a feedback orthogonal sequence corresponding to the measured MCS level, from among a plurality of different orthogonal sequences, to 3 distributed hybrid automatic repeat request (HARM) mini-tiles (HMTs) which are uplink resources allocated to the feedback channel, wherein the HMT comprises 2 contiguous subcarrier and 2 OFDM symbols; and
    transmitting the feedback channel.

2. The method of claim 1, wherein the MCS level is represented by 2 bits.

3. The method of claim 1, wherein the MCS level is a measurable MCS level in a group, if the mobile station is allocated to the group including a plurality of mobile stations.

4. The method of claim 1, wherein the mapping the feedback information to the feedback channel comprises:
    generating a feedback sequence based on the feedback information, mapping the feedback sequence to a feedback symbol by modulating and repeating the generated feedback sequence, and mapping the feedback symbol to a subcarrier allocated to the feedback channel.

5. The method of claim 4, wherein:

uplink resources allocated to the feedback channel comprise 3 distributed tiles, and the tile comprises 2 contiguous subcarrier and 6 orthogonal frequency division multiplexing (OFDM) symbols.

6. The method of claim 4, wherein the feedback information is multiplexed with feedback information of at least one another user and mapped to the feedback channel.

7. The method of claim 1, wherein a number of the plurality of different orthogonal sequences is extended.

8. The method of claim 1, wherein some pieces of multiple-input multiple-output (MIMO) information or bandwidth request information are indicated by using some of the plurality of different orthogonal sequences.

9. An apparatus for transmitting a feedback channel in a wireless communication system, the apparatus comprising:

a radio frequency (RF) unit configured to transmit the feedback channel; and a processor, coupled to the RF unit, and configured for:

measuring a modulation and coding scheme (MCS) level obtained by quantizing a carrier to interference plus noise ratio (CINR) of a mobile station, wherein the CINR is a differential CINR which is a difference value between the CINR and a reference CINR, and mapping feedback information, including the MCS level, to the feedback channel, wherein the mapping the feedback information to the feedback channel comprises mapping a feedback orthogonal sequence corresponding to the measured MCS level, from among a plurality of different orthogonal sequences, to 3 distributed hybrid automatic repeat request (HARM) mini-tiles (HMTs) which are uplink resources allocated to the feedback channel, wherein the HMT comprises 2 contiguous subcarrier and 2 OFDM symbols.

10. The apparatus of claim 9, wherein the MCS level is represented by 2 bits.

11. The apparatus of claim 9, wherein the MCS level is a measurable MCS level in a group, if the mobile station is allocated to the group including a plurality of mobile stations.

* * * * *